INVENTOR.
ROLAND F. BRYAN
BY Samuel Lindenberg
Arthur Freilich
ATTORNEYS

| SEQU. | ORIGIN | ERASE | VECTOR |
|---|---|---|---|
| 1 | 1 = ORIGIN + ERASE | | 0 = VECTOR |
| 2 | 0 = ORIGIN | 1 = ERASE | 1 = VECTOR |
| 3 | | | |
| 4 | | SELECTION CODE | 1ST VECTOR |
| 5 | | | |
| 6 | | | |
| 7 | X | | |
| 8 | CO-ORDINATE | | 2ND VECTOR |
| 9 | | | |
| 10 | | | |
| 11 | | | |
| 12 | | | 3RD VECTOR |
| 13 | | | |
| 14 | | | |
| 15 | | | |
| 16 | Y | | 4TH VECTOR |
| 17 | COORDINATE | | |
| 18 | | | |
| 19 | | | |
| 20 | | | 5TH VECTOR |
| 21 | | | |
| 22 | | | |
| 23 | | | |
| 24 | SELECTION | | 6TH VECTOR |
| 25 | CODE | | |
| 26 | | | |
| 27 | | | — |
| 28 | — | — | — |

ROLAND F. BRYAN
INVENTOR.

BY Samuel Lindenberg
Arthur Frelich
ATTORNEYS

ROLAND F. BRYAN
INVENTOR.

BY Samuel Lindenberg
Arthur Frederick
ATTORNEYS

INVENTOR.
ROLAND F. BRYAN
BY Samuel Lindenberg
Arthur Freilich
ATTORNEYS

INVENTOR.
ROLAND F. BRYAN
BY Samuel Lindenberg
Arthur Freilich
ATTORNEYS

ROLAND F. BRYAN
INVENTOR.
BY Samuel Lindenberg
Arthur Frelich
ATTORNEYS

ROLAND F. BRYAN
INVENTOR.

BY Samuel Lindenberg
Arthur Frederick
ATTORNEYS

United States Patent Office 3,438,003

Patented Apr. 8, 1969

3,438,003
DATA COMPRESSION SYSTEM

Roland F. Bryan, Chatsworth, Calif., assignor to The Bunker-Ramo Corporation, Stamford, Conn., a corporation of Delaware Filed June 10, 1966, Ser. No. 556,684
Int. Cl. G06f 3/14
U.S. Cl. 340—172.5 11 Claims

ABSTRACT OF THE DISCLOSURE

A system including display equipment responsive to digitally represented data for presenting a visual display of such data on a display point matrix such as is provided by a cathode ray tube. The system responds to applied origin codes to display any point in the matrix and to applied vector codes to display unit length vectors extending from previously displayed points in directions identified by the codes. Selected vector codes include additional information defining vector length; e.g., a defined plurality of unit length vectors.

This invention relates generally to improvements in data compression and display apparatus and finds particular utility in multiuser computer systems wherein user stations are located remote from a central computer.

U.S. patent application Ser. No. 432,585, filed on Feb. 15, 1965, and assigned to the same assignee as the present application, discloses a data compression and display system particularly useful for enabling a user to communicate with an on-line computing system over a limited bandwith channel such as a telephone line. In accordance with the disclosed embodiments of the cited patent application, reference to which is not necessary for a full understanding of the present invention, information to be displayed is represented in terms of codes describing points on a matrix and short line segments or vectors extending in selected directions therefrom.

More particularly, rather than creating a curve, e.g., representing a function, by digitally defining the absolute position in an M x N matrix of each of the points thereon, the invention in the cited application is based on the recognition that less information and lower priced equipment can be employed if an origin point is absolutely defined and subsequent points are defined in terms of their incremental distance from the immediately preceding point. Thus, if an origin point is initially defined by twenty bits (assuming an exemplary 1024 x 1024 matrix), a subsequent point can be defined in fewer bits if adjacent function points are reasonably close. For example, if each function point is spaced no more than two units in the matrix in either the X or Y direction from a preceding point, a subsequent point can be defined in only four bits, two bits for the X coordinate and two bits for the Y coordinate. Inasmuch as a user such as a scientist or mathematician usually deals with curves involving natural phenomena in which changes are gradual, this limitation is not very restrictive as a practical matter. In any event, so long as one is willing to tolerate any restriction whereby a subsequent point is defined in terms of some sub-area of the entire display matrix around a preceding point, rather than in terms of its absolute position in the display matrix, some degree of economy is introduced; that is, the sub-area can be an M′ x N′ matrix where M>M′ and N>N′.

In the preferred embodiment of the invention of the cited patent application, a particularly useful sub-area of the entire display matrix is chosen; namely a 5 x 5 matrix with the origin or the preceding point at the center. By restricting subsequent display points to the 16 points on the perimeter of this 5 x 5 matrix, only four bits are required to define the position of a subsequent point. These four bits can be used to modify a digitally expressed absolute position held in a display register. By iteratively modifying the contents of the display register P times, P points can be defined which together form a short line segment or unit length vector. By stringing these vectors end to end, a desired curve can be displayed.

The present invention is based on the recognition that the data required to display a selected curve can be reduced even further by providing, in selected vector codes, additional information defining the length of a vector to be displayed. More particularly, instead of using vector codes which define only the direction of a vector having a fixed length, in accordance with the present invention vector codes are employed which define both direction and length.

For example, in the preferred embodiment of the present invention, six bit vector codes can be processed in addition to the four bit vector codes described in the cited patent application. The additional two bits are used to define the number of times the unit length vector is to be repeated, i.e., one, two, or three times. In this manner, four different vector lengths and sixteen different vector directions can be specified by a six bit code from the computer. Because these six bit vector codes are particularly useful for forming alphanumeric characters, they will be referred to as alphanumeric (*A/N*) vector codes to distinguish them from the four bit vector codes. It should be understood, however, that the *A/N* codes are also useful for forming long straight portions of curves. It should also be recognized that other code formats can be employed in accordance with the invention in order to offer a still greater selection of vector directions and lengths.

The novel features that are considered characteristic of this invention are set forth with particularity in the appended claims. The invention itself will best be understood from the following description when read in connection with the accompanying drawings, in which:

Figure 1:
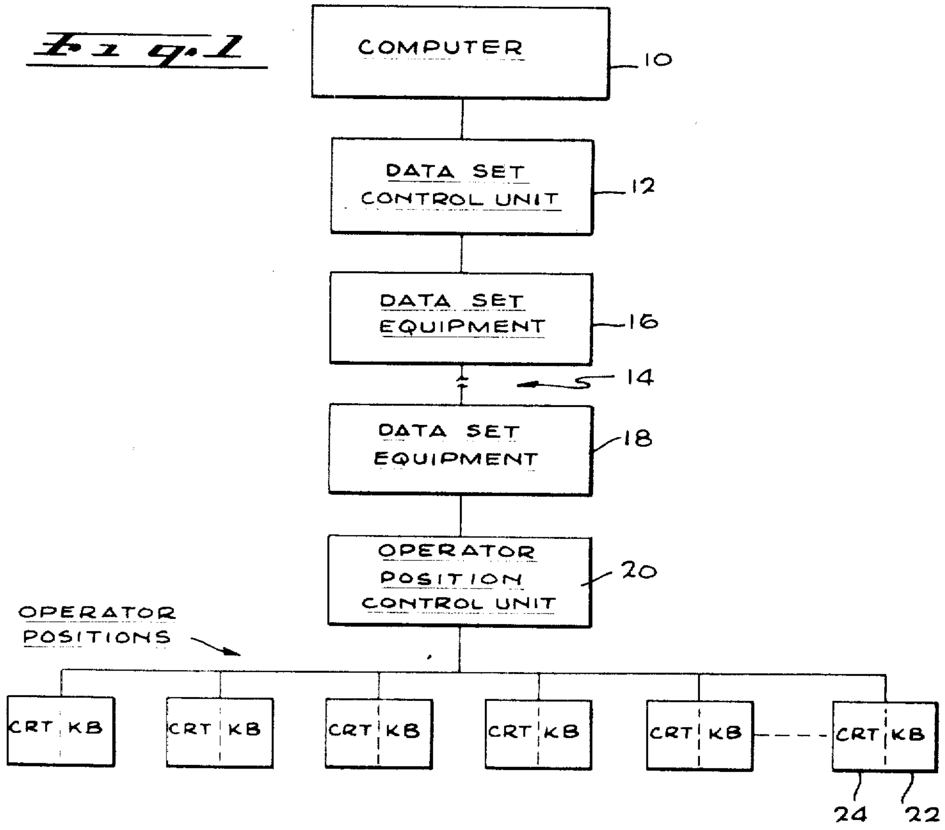
FIGURE 1 is a block diagram of a multiuser on-line computer system in accordance with the teachings of the aforecited patent application.
Figures 5A, 5B:
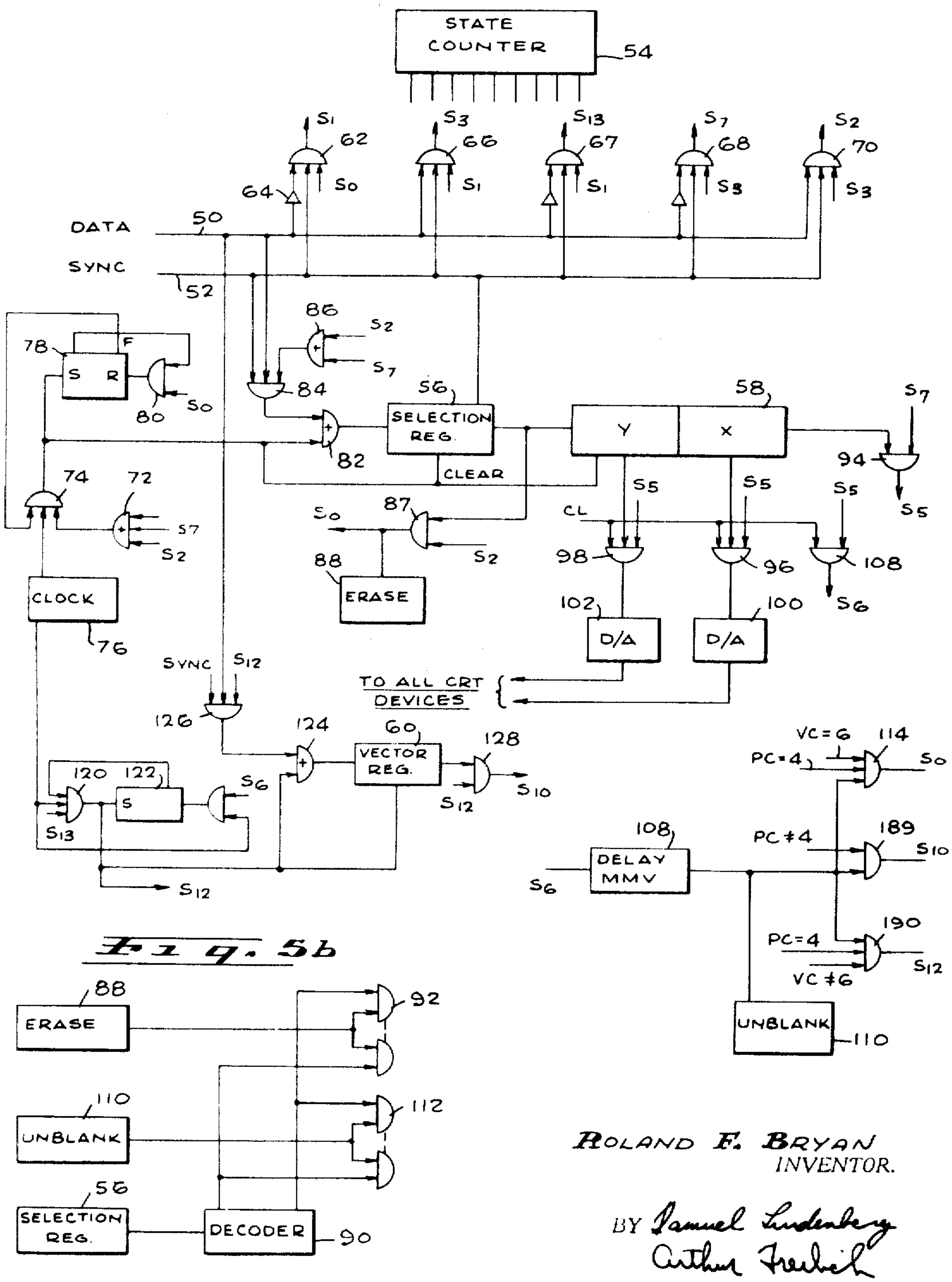
Figure 5C:
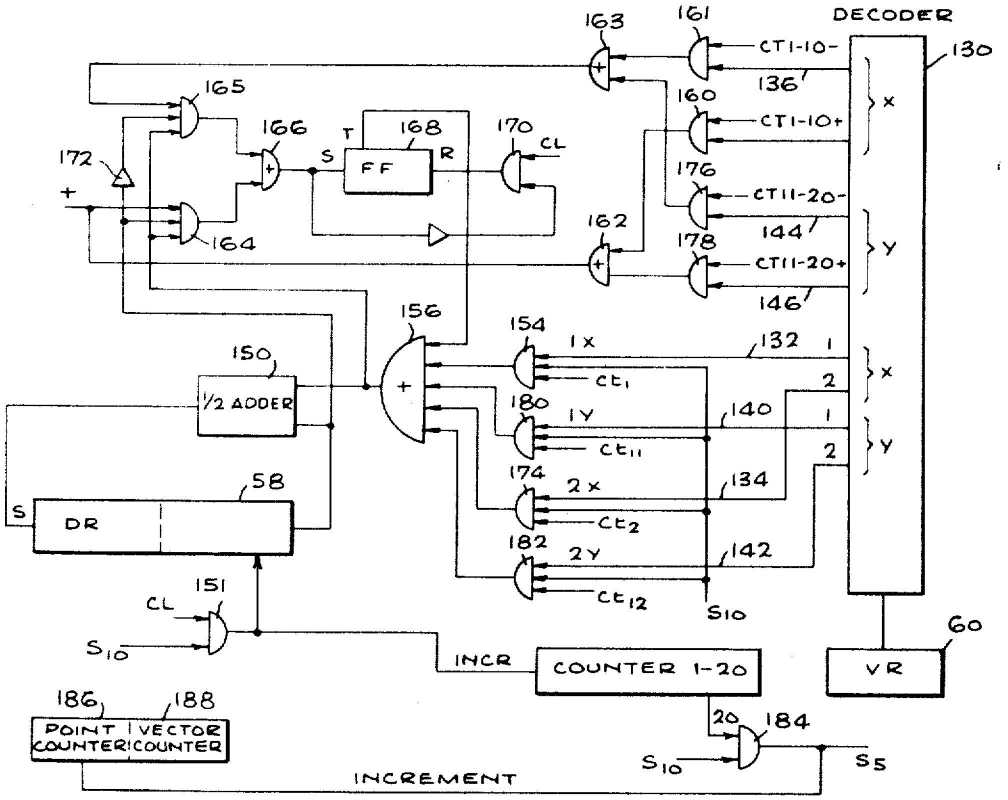
Figure 5D:
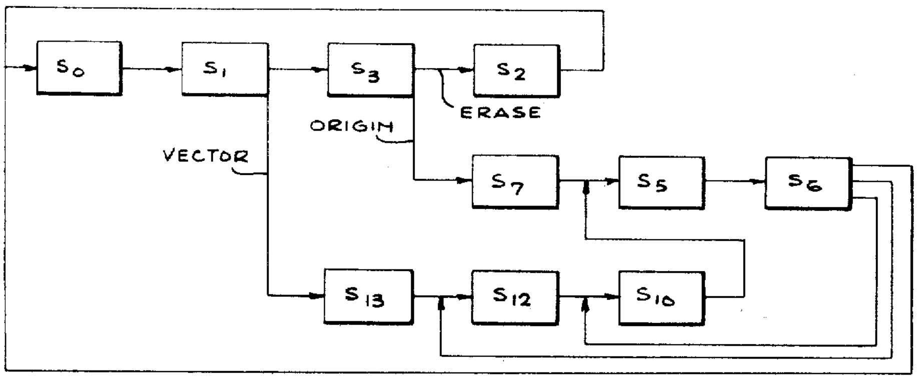
Figure 6:
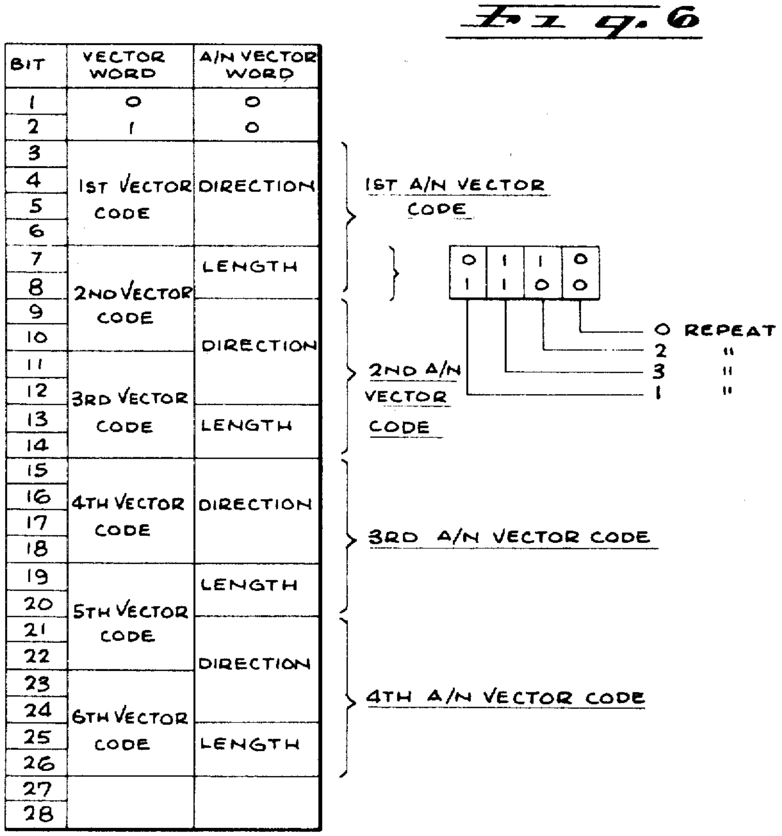
Figure 8:
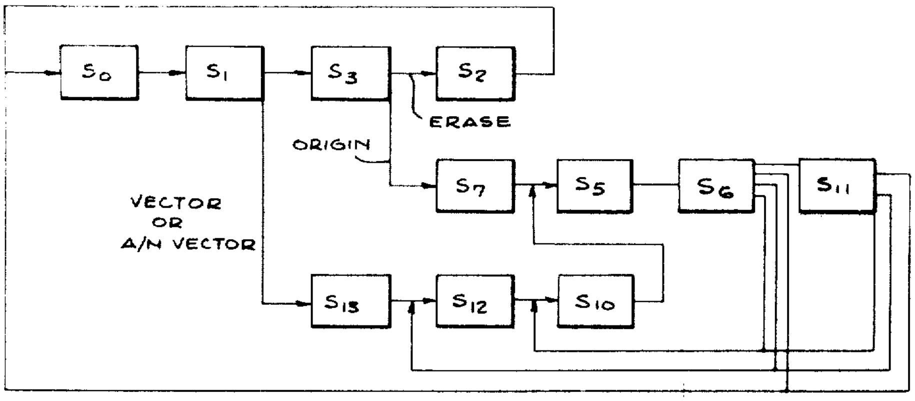
Figure 7A:
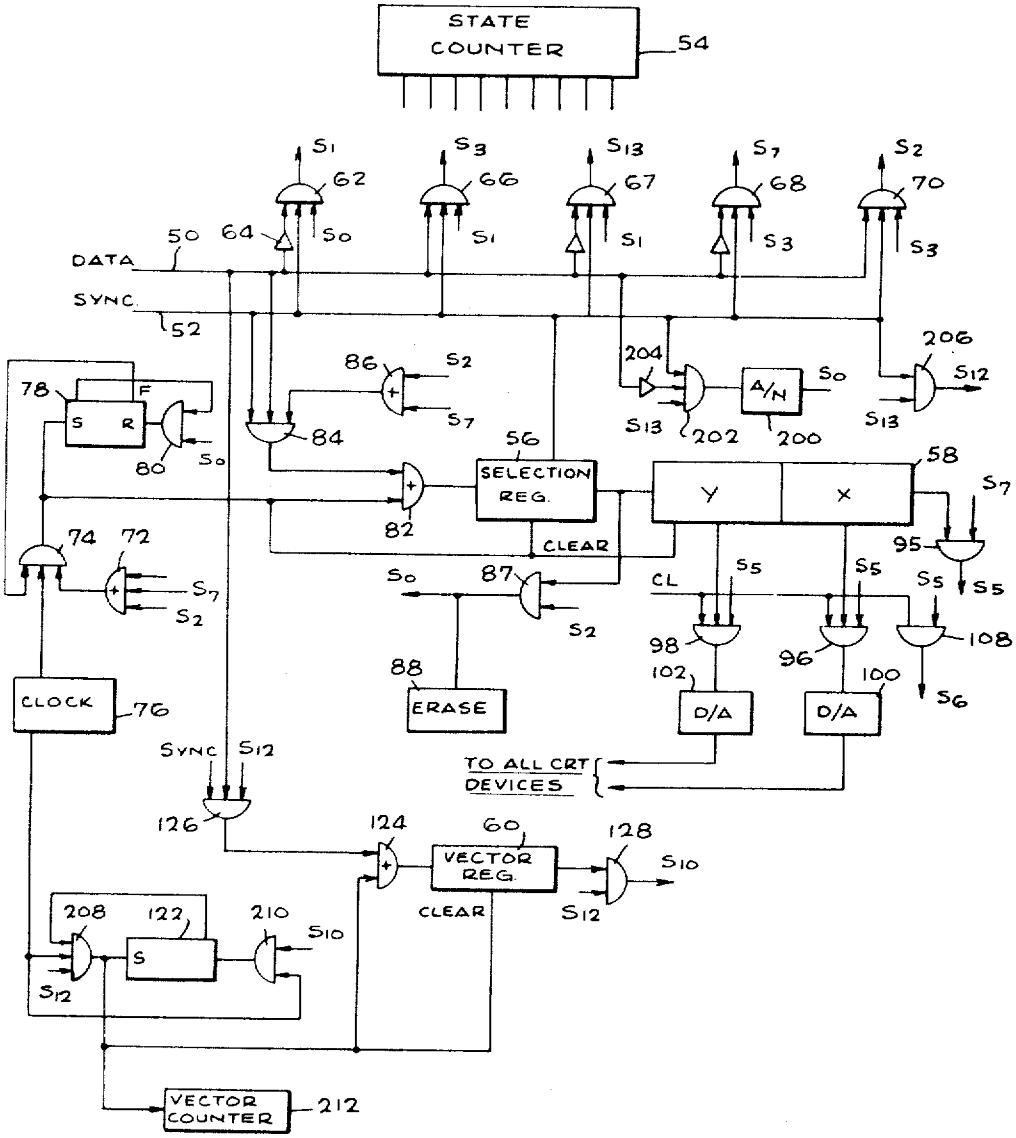
Figure 7B:
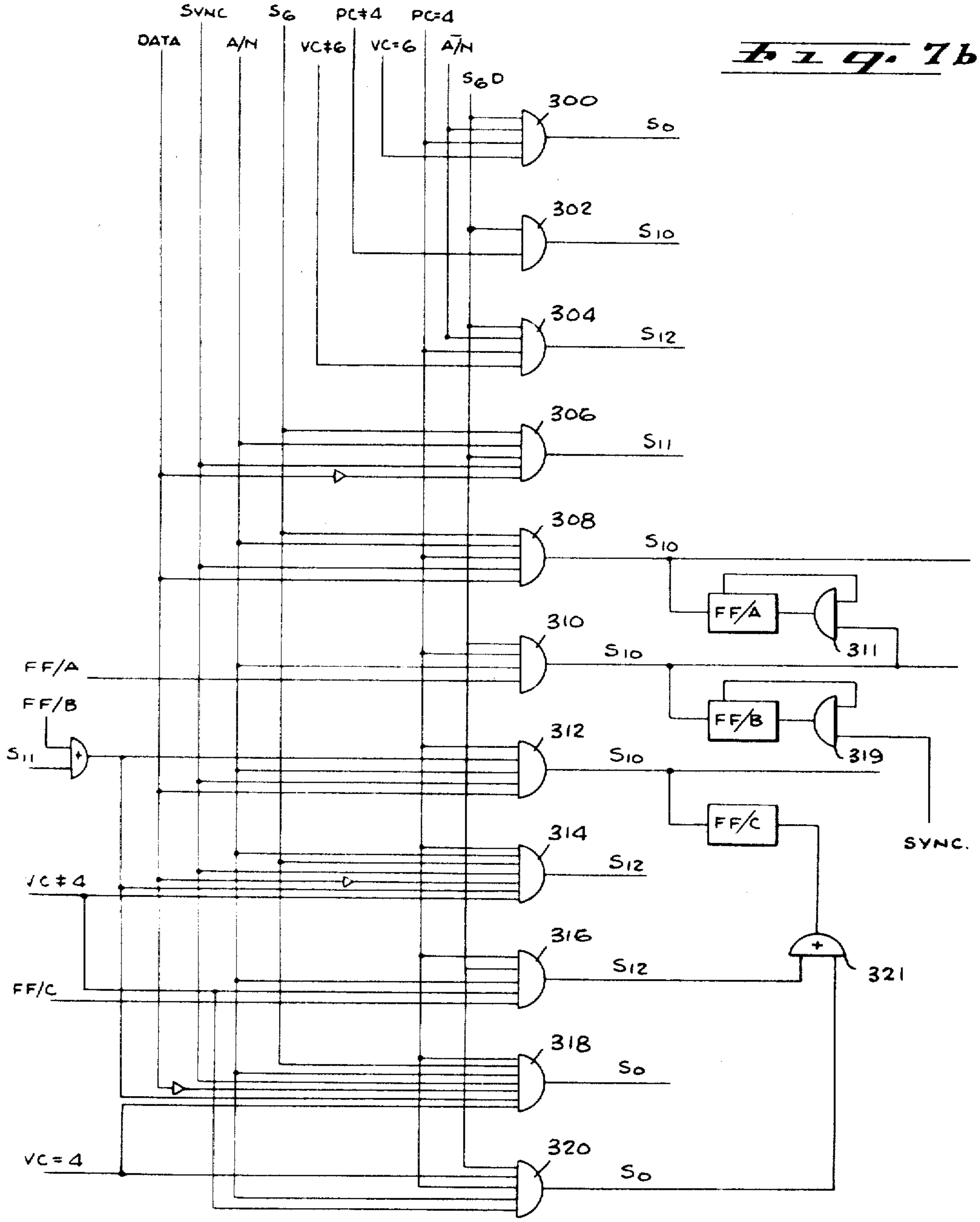

FIGS. 5(a) through 5(c) comprise block diagrams illustrating display portions of the operator position control unit of FIG. 1;

FIG. 5(*d*) is a flow chart illustrating the sequence of states defined by the state counter of FIG. 5(*a*);

FIG. 6 is a diagram illustrating a representative alphanumeric vector word format in accordance with the present invention;

FIGS. 7(*a*) and 7(*b*) comprise block diagrams illustrating portions of an operator position control unit in accordance with the present invention; and FIG. 8 is a flow chart illustrating a sequence of states defined by the state counter of FIG. 7(*a*).

Prior to considering the figures in detail, it is pointed out that FIGS. 1 through 5(*d*) are identical to the corresponding figures in the aforecited patent application except for minor corrections which have been incorporated herein. Accordingly, the portions of the specification herein concerning FIGS. 1 through 5(*d*) are substantially identical to the corresponding portions of the aforecited patent application. The improvements introduced by the present invention are specifically illustrated in FIGS. 6 through 8 which, when considered in the light of FIGS. 1 through 5(*d*) along with related portions of this specification, are fully disclosed and susceptible of understanding without the need of referring to the aforecited patent application.

Attention is now called to FIG. 1 of the drawings, which comprises a block diagram of a multiuser on-line computer system in which the invention can be advantageously employed. The system of FIG. 1 includes a general purpose digital computer 10 which is coupled to a data set control unit 12. The data set control unit 12 in turn is connected to telephone lines 14 through commercially available data set equipment 16. Data set equipment 18 is connected to a second end of the telephone lines 14 and couples the telephone lines to an operator position control unit 20. The control unit 20 in turn is connected to each of a plurality of operator positions or stations, each station including a manually operable keyboard 22 and a display means, preferably in the form of a cathode ray tube device 24.

The plurality of operator positions can be located throughout an industrial or university research center, for example, which center can be situated many miles from the location of the computer 10. In the operation of the system of FIG. 1, each operator position will be available to a different user. Each user is able to input data to the computer 10 via the keyboard 22 and in turn the computer is able to respond to the user's requests and output data to his operator position in the form of graphical displays presented on the cathode ray tube device 24. The operator position control unit 20 functions to sequentially respond to keyboard signals coming from each of the various operator positions. Although a priority system could be utilized to give certain operator positions priority over others in the event of virtually simultaneous activity, no such priority system will be considered herein. Rather, as will be better understood from what shall be said hereinafter, the control unit 20 will examine each operator position in sequence and respond to any keys which have been actuated.

It is desirable that an on-line computer system which is to be useful to the research scientist have the outward capability of operating on functions rather than individual numerical quantities. Functions of two variables can be represented as a curve in the XY plane which curve contains a plurality of points each having a certain X or abscissa value and a certain Y or ordinate value.

For example, consider the functions represented by the entries in Table I below:

TABLE I

| X | Y | X | Y | X | Y |
|---|---|---|---|---|---|
| 5.0 | 1700 | 6.4 | 1740 | 7.8 | 1700 |
| 5.2 | 1780 | 6.6 | 1660 | 8.0 | 1620 |
| 5.4 | 1780 | 6.8 | 1660 | 8.2 | 1620 |
| 5.6 | 1780 | 7.0 | 1660 | 8.4 | 1620 |
| 5.8 | 1800 | 7.2 | 1680 | 8.6 | 1640 |
| 6.0 | 1820 | 7.4 | 1700 | 8.8 | 1640 |
| 6.2 | 1780 | 7.6 | 1780 | 9.0 | 1640 |

Figure 2:
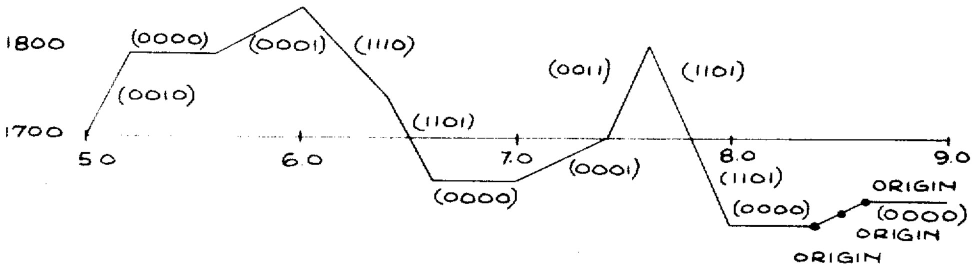
FIG. 2 illustrates a curve representing an arbitrarily selected function.

Table I represents an arbitrarily selected function expressing the relationship between two variables. FIG. 2 illustrates this function plotted in the XY plane. Functions of two or more variables are constantly being considered by a research scientist in the analysis of various problems. In order to facilitate this analysis, it is exceedingly helpful for the scientist to have the function presented to him in a graphical manner as shown in FIG. 2, since various characteristics of the function can be very revealing to a skilled scientist. More particularly, the graphical presentation of a function permits a scientist to more easily pursue trial and error solutions, exercise his intuition, etc. As a very basic example, not illustrated in FIG. 2, the appearance of a discontinuity or a recurring pattern in a function can be very meaningful to a skilled person.

The values in Table I can be stored in the memory of the computer 10 after, for example, being derived as a result of operations performed on two other functions. For example, the function represented in Table I can comprise the product of two other functions.

According to conventional display techniques, in order to display the curve of FIG. 2 on a cathode ray tube device 24, the values of Table I can be converted to deflection voltages for positioning the cathode ray tube beam. For example, let it be assumed that the cathode ray tube device 24 defines a 1024 x 1024 matrix of display points. The computer 10, by determining the range of its abscissa values (herein $\Delta X=9.0-5.0=4.0$), can convert each of the actual X values to a corresponding point in the matrix of display points. Similarly, the computer can convert each Y value from Table I into an ordinate value corresponding to one of 1024 positions in the display matrix. Table II lists the abscissa and ordinate values which can be digitally represented and applied to the deflection means of a cathode ray tube device through a digital-to-analog converter for generating the curve of FIG. 2 representing the function by Table I.

TABLE II

| X | Y | X | Y |
|---|---|---|---|
| 0 | 400 | 561 | 300 |
| 51 | 800 | 612 | 400 |
| 102 | 800 | 663 | 800 |
| 153 | 800 | 714 | 400 |
| 204 | 900 | 765 | 000 |
| 255 | 1000 | 806 | 000 |
| 306 | 800 | 857 | 000 |
| 357 | 600 | 908 | 100 |
| 408 | 200 | 959 | 100 |
| 459 | 200 | 1010 | 100 |
| 510 | 200 | | |

By successively coupling the values presented in Table II to the cathode ray tube deflection means, and by unblanking the cathode ray tube beam after it has been positioned at each point, a series of points in alignment with the curve of FIG. 2 will be presented on the cathode ray tube. By providing line drawing equipment, straight lines can be drawn between adjacent points to thus substantially duplicate the curve shown in FIG. 2. Although apparatus for drawing lines is known in the prior art, the provision of such apparatus in an actual system represents a considerable expense which could well make the entire system of FIG. 1 economically unjustified. By spacing the values of Table II closely enough so that the unblanked points displayed by the cathode ray tube are contiguous, the necessity of providing line drawing equipment can be avoided. However, when the information to be displayed is transmitted over telephone lines, the telephone line bandwidth limits the amount of information which can be provided to the operator positions in a unit time interval.

More particularly, if the display matrix includes 1024 abscissa points, ten binary digits (bits) are required to position the beam in the X direction. Similarly, ten bits are required to represent the ordinate value. Thus, for each point to be displayed according to conventional techniques, twenty bits must be conveyed from the computer over the telephone line to the cathode ray tube device. Since 417 microseconds are ordinarily required to convey single bits of information, the rate at which all the operator positions could be serviced by the computer would be undesirably slow, thereby considerably reducing the effectiveness of the system as an analysis tool for the scientist. If line drawing equipment is not to be used to connect points, thus making it desirable that the transmitted points actually be overlapping, a much greater amount of data would have to be transmitted, of course, making the servicing of each operator position even slower. In accordance with the invention of the aforecited patent application, a method and apparatus for presenting digital information representative of a function to be displayed are disclosed which enables the computer to service the operator positions at a significantly greater rate. For example, whereas it has been seen that twenty bits are required to represent a single matrix display point, it will be shown that, in accordance with the invention of the aforecited patent application, most display points can be represented by a single bit, and, in accordance with the teachings of the present invention, more than one display point can be represented per bit.

Figures 3, 4:
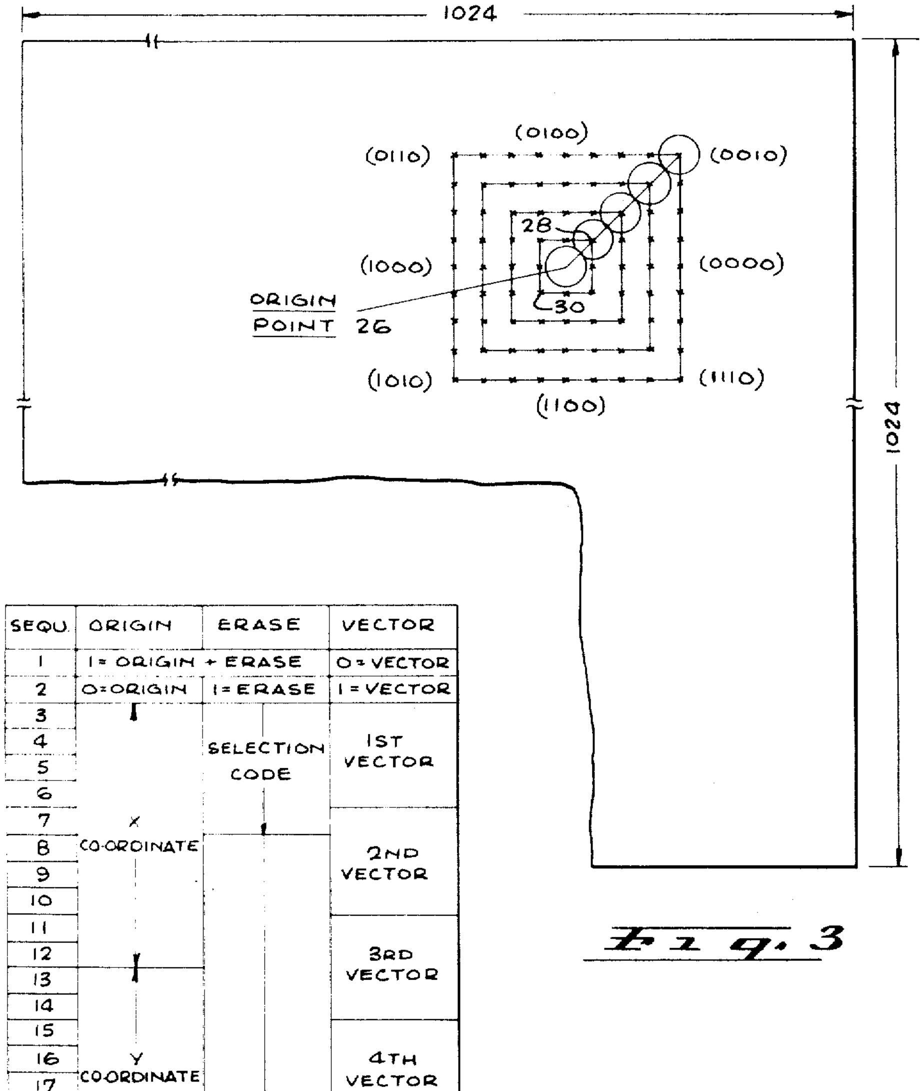
FIG. 3 is a diagram of a plurality of vectors each of which can be selectively chosen and coupled to form the curve of FIG. 2.
FIG. 4 is a diagram illustrating a representative digital word format which can be utilized in the system of FIG. 1.

Attention is now called to FIG. 3, which illustrates an origin point 26 displayed on an exemplary 102 x 1024 display matrix. The origin point can comprise any point on a curve to be displayed and its position can be defined by twenty bits; i.e., ten bits to represent the X coordinate and ten bits to represent the Y coordinate. The position of a subsequent point can be defined in terms of how the X and Y coordinates of the origin point can be modified. More particularly, if the assumption is made that a subsequent point 28 will be coincident with one of the sixteen points on the perimeter 30 of a 5 x 5 matrix around the origin point as a center, the position of the subsequent point can be defined by only four bits. In very many real situations, this assumption does not visibly affect the accuracy of the displayed curve. If greater accuracy is desired, of course, five bits, for example, can be used to permit the subsequent point to be positioned in any one of 32 positions. On the assumption that 16 positions will suffice, the four bit code associated with each position will either increment or decrement the X or Y coordinates of the origin point by one or two or will leave it unchanged. In order to position the subsequent point as illustrated in FIG. 3, it would be necessary to increment both the X and Y coordinates by two, assuming conventional rectangular coordinate polarities.

In order to avoid the necessity of providing line drawing equipment, the 16 possible subsequent point positions should be chosen so that points displayed thereat will be contiguous with the origin point as shown in FIG. 3. It should thus be apparent how the positions of points on a curve can each be defined by four, rather than twenty, bits once the position of an origin point has been defined. Recognizing that most curves can be made up of a series of short line segments or vectors strung end to end without sacrificing significant accuracy, the four bits can be used to define still an additional arbitrary number of points to thus create a unit length vector. It will be assumed herein that each unit length vector is comprised of four contiguous points.

FIG. 3 illustrates a four bit code word used to identify each of several of the 16 vectors, the initial vector along the X axis in a positive direction being identified by the code word (0000), and subsequent vectors in a counterclockwise direction being identified by numerically succeeding code words. The code words required to define each of the unit length vectors used to make up the curve of FIG. 2 are shown therein.

It is contemplated, of course, that the deflection technique thus far discussed with respect to FIG. 3 will find principal application in cathode ray tube devices, although it should be appreciated that they can be extended to other X–Y deflection apparatus as, for example, moving stylus devices. Although conventional cathode ray tubes require that a display be continually refreshed if it is to be maintained, storage type cathode ray tubes have recently become available which will maintain a display without refreshment until the display is erased. In order to avoid the need for refreshing displays, the cathode ray tube devices 24 of FIG. 1 will be assumed to be of the storage type. In order to display curves, therefore, it is only necessary that three different command words be provided by the computer 10 to the operator position control unit 20; that is, an erase command word must be definable in order to clear a cathode ray tube. Secondly, an origin command word must be definable to designate the abscissa and ordinate of an origin point. Thirdly, a vector command word is required to designate vectors to be drawn from the origin point. Since the origin command word requires five bits to represent an operator position, assuming the system includes 32 such positions, and 20 bits to designate the origin point position, a word length of 28 bits will be assumed. FIG. 4 illustrates an exemplary command word format for the system of FIG. 1. The initial two bits in each command word identify the word as being either an erase, an origin, or a vector word. In the erase word, the succeeding five bits comprise a selection code identifying one of the plurality of operator positions. In the origin word, the twenty bits following the initial two bits identify the position of the origin point to be displayed on the display matrix. The succeeding five bits comprise a selection code identifying an operator position. The initial two bits in the vector word identify it as such. The succeeding bits are arranged in groups of four, each group identifying a different one of the 16 selectable vectors. Thus, each vector command word can identify six vectors which, as will be seen hereinafter, are sequentially processed to accordingly deflect the cathode ray tube beam.

The erase, origin, and vector words are provided by the computer in a sequence determined by its stored program. Thus, when a new curve is to be displayed by a cathode ray tube device, an erase word can be initially provided including the selection code identifying that device. Then an origin word identifying the positon of one point on the desired curve can be provided. Then vector words can be provided to draw the remainder of the curve. The vector words can be formed by the computer by, for example, determining the slope between adjacent function points.

Attention is now called to FIG. 5 of the drawings, which illustrates a preferred implementation of the display portion of the operator position control unit 20 of FIG. 1. The data set equipment 18 of FIG. 1 provides a data line 50 and a sync pulse line 52 to the control unit 20. The bits of each of the command words shown in FIG. 4 appear serially on the data line 50 coincident with a pulse appearing on the sync line 52.

A state counter 54 is provided which is capable of defining a plurality of different states which control the operations to be performed on the incoming data. The states of the control counter are set forth in a flow diagram in FIG. 5(*d*). State $S_0$ identifies a rest state which is defined by the counter 54 between the transmission of command words. When data is not being transmitted on data line 50, the line is at a voltage level defining a binary "1" state. Immediately prior to the transmission of data, a "start" (binary "0") pulse is applied to the data line 50 which causes the state counter 54 to switch to state $S_1$. If the next bit appearing on the data line 50 comprises a "1" identifying either an origin or erase command word, the counter switches to state $S_3$. If the succeeding bit is also a "1", the erase word is indicated and the counter switches to state $S_2$ during which a selection register 56 is loaded with the selection code and the selected cathode ray tube device 24 is erased. After state $S_2$, the counter 54 is returned to state $S_0$. In the event an origin command word is defined, the counter switches to state $S_7$ from state $S_3$, during which state both the selection register 56 and the display register 58 are loaded. After these registers are loaded, the counter 54 is switched to state $S_5$, which transfers the contents of the display register 58 through digital-to-analog converters to the deflection means of the selected cathode ray tube device. After state $S_5$, state $S_6$ is defined, which introduces a delay to allow for the cathode ray tube beam to settle at its newly defined position prior to switching back to state $S_0$.

After state $S_1$, if a vector word is defined, the counter 54 switches to state $S_{13}$ during which a vector register 60 is cleared. Subsequently, during state $S_{12}$, the vector register 60 is loaded with four bits representing the initial vector. Subsequently, during state $S_{10}$, the contents of the vector register 60 are utilized to appropriately increment or decrement the contents of the display register 58. After state $S_{10}$, state $S_5$ is defined, during which the beam is unblanked at its newly defined position. After state $S_5$, state $S_6$ is defined. Unless the four points of the vector presently being operated upon have already been drawn, the state counter 54 will return to state $S_{10}$ after state $S_6$. If the four points in the vector have been drawn, the counter will switch to state $S_{12}$ to enter the four bits of the succeeding vector in the same vector word into the vector register 60. At the end of state $S_6$, after all four points of the sixth vector of a vector word have been drawn, the counter 54 can be switched back to state $S_0$. With the foregoing brief introduction of the operation of the display portion of the operator position control unit, the implementation thereof will now be considered in detail.

An AND gate 62 is provided whose inputs are respectively connected to the state $S_0$ output terminal of the state counter 54, the sync pulse line 52, and through an inverter 64 to the data line 50. Thus, AND gate 62 will provide a true output signal to shift the counter 54 to state $S_1$ when a "0" data bit appears when the counter 54 defines state $S_0$. When AND gate 66 subsequently provides a true output signal, in response to a "1" data bit, indicating reception of an erase or origin word, the state counter is switched to state $S_3$. If the succeeding bit appearing on the data line 50 is a "0", thereby defining an origin word, gate 68 will switch the counter 54 to state $S_7$. On the other hand, if the second bit appearing on the data line 50 after the start pulse is a "1", thereby defining an erase word, gate 70 will switch the state counter 54 to state $S_2$.

Consider initially the arrival of an erase word meaning that state $S_2$ is defined. The state $S_2$ output terminal of the state counter 54 is connected to the input of OR gate 72 whose output is connected to the input of AND gate 74. A second input to the AND gate 74 is derived from the output of a clock pulse source 76 whose frequency is much greater than that of the sync pulses appearing on sync pulse line 52. A third input applied to the gate 74 comprises the false output terminal of a set-reset flip-flop 78. The output of gate 74 is connected to the set input terminal of flip-flop 78. Thus, if flip-flop 78 is initially in a false condition, as soon as state $S_2$ is defined, gate 74 will provide a true output pulse in response to the first clock pulse provided by source 76 to thus switch the flip-flop 78 to a true state. The true output terminal of flip-flop 78 is connected to the input of AND gate 80 along with the state $S_0$ output terminal of counter 54. The output of gate 80 is connected to the reset input terminal of flip-flop 78. Thus, flip-flop 78 will not be reset until state $S_0$ is defined. The true output pulse provided by AND gate 74 is coupled to the input of an OR gate 82 whose output is connected to the data input terminal of the selection register 56. Thus, a "1" bit can be entered into the register 56 as soon as state $S_2$ is defined and prior to the data bits of the selection code arriving on data line 50. In addition, the output of gate 74 is connected to the "clear" terminals of both the selection register 56 and the display register 58. The application of a true signal to the "clear" terminal of register 56 clears all positions thereof but, however, permits the "1" bit to be written into the first position thereof.

A second input to the OR gate 82 is derived from the output of AND gate 84 whose inputs are connected to the sync pulse line 52 and data line 50. A third input to the AND gate 84 is derived from the output of OR gate 86. The state $S_2$ output terminal of counter 54 applied to the input of gate 86.

The selection register 56 comprises a shift register which shifts its contents one position to the right in response to each sync pulse appearing on line 52. Thus, each succeeding bit of the selection code of the erase word will be entered into the selection register 56 coincident with occurrence of a sync pulse. The "1" bit entered prior to the selection code bits will be shifted through the register 56 and will appear at the output of the register as soon as the register is fully loaded. The output of register 56 is connected to the input of AND gate 87 along with the state $S_2$ output terminal of counter 54. The output of gate 87 initiates the operation of an erase means 88 which provides an erase pulse to the cathode ray tube device identified by the selection code in the register 56. More particularly, as can be seen in FIG. 5(*b*), the output of the selection register 56 is applied to a decoder circuit 90 which has a plurality of output terminals, each corresponding to a different one of the cathode ray tube devices. Each of these output terminals is connected to the input of a different gate 92 whose outputs are respectively connected to the erase input terminal of a different one of the cathode ray tube devices. The output of the erase means 88 is connected to the input of each of the gates 92.

The output of previously referred to gate 87 is also connected to the state counter 54 to drive it to state $S_0$ when gate 87 provides a true output signal. Accordingly, it has been shown how a selected cathode ray tube device 24 can be erased in response to the appearance of an erase word on the data line 50.

In response to an origin word, state $S_7$ will be defined after state $S_3$, as previously noted. The state $S_7$ output terminal of counter 54 is connected to the input of OR gate 72 to thus enter a "1" bit immediately prior to the bits of the origin word appearing on the data line 50. The output of the selection register 56 is connected to the input of the display register 58. Thus, all the bits of the X and Y coordinates will be shifted into the display register 58 and all the bits of the selection code into the selection register 56 prior to the initial "1" bit appearing at the output of the register 58. The output of the register 58 is connected to the input of AND gate 94 whose second input is derived from the state $S_7$ output terminal of the state counter 54. The output of gate 94 is connected to the state counter to drive it to state $S_5$. The outputs of the X and Y coordinate portions of the register 58 are respectively connected to the input of AND gates 96 and 98. Second and third inputs to each of AND gates 96 and 98 are derived from the clock pulse source 76 and the state $S_5$ output terminal of the counter 54. The outputs of gates 96 and 98 are respectively applied to the inputs of storage type digital-to-analog converters 100 and 102 which develop analog signals which are applied to all of the cathode ray tube devices. Thus, during state $S_5$, the beams of all the cathode ray tube devices are deflected to corresponding display positions identified by the information loaded into the display register 58. An AND gate 108 is provided which is responsive to the clock pulse and state $S_5$ defined by the counter 54 for driving the counter to define state $S_6$.

During state $S_6$, a delay monostable multivibrator 108 is set to its unstable condition to introduce a time delay to allow the beams to settle in their new positions. After the multivibrator 108 returns to its stable state, a pulse is provided which energizes a beam unblanking means 110 to unblank the beam in the selected cathode ray tube device through gating means 112 controlled by decoding means 90 responsive to the display register 58. In addition, the multivibrator pulse switches the counter 54 back to state $S_0$ through gate 114. In the event a vector word was being operated upon, the counter 54 could be switched from state $S_6$ to either state $S_{10}$ or $S_{12}$, as will be more apparent hereinafter, if display points remain to be drawn.

In response to a vector word appearing on the data line 50, state $S_{13}$, as aforedescribed, will be defined after state $S_1$. During state $S_{13}$ AND gate 120 will provide a true output signal to the set input terminal of flip-flop 122 in response to the initial clock pulse provided by source 76 subsequent to state $S_{13}$ being defined. The output of gate 120 in addition is connected to the input of OR gate 124 and to the "clear" input terminal of register 60. The output of gate 124 is connected to the data input terminal of register 60. Thus when gate 120 provides a true output signal, it causes an initial "1" to be written into the first stage of vector register 60 and the rest of the register to be cleared. In addition, the output of gate 120 drives counter 54 to state $S_{12}$. During state $S_{12}$, the succeeding four bits appearing on the date line 50 are coupled through AND gate 126 and gate 124 into the vector register 50. When four bits have been loaded therein, the initial "1" will appear on the output line of the register 60 and be applied to the input of AND gate 128, which is enabled during state $S_{12}$ to thus switch the state counter 54 to state $S_{10}$. During state $S_{10}$, the contents of the display register 58 are incremented or decremented in accordance with the four bits stored in the vector register; that is, it will be recalled that from an origin point, defined by the contents of the display register 58, the X and Y coordinates are either left unchanged or incremented or decremented by one or two. FIG. 5(c) illustrates the preferred implementation for modifying the contents of the display register in accordance with the four-bit vector codes stored in the vector register.

Attention is now called to FIG. 5(c), which illustrates the details of a preferred means of modifying the contents of the display register in accordance with the vector information stored in the vector register 60. A decoder circuit 130 is provided which is responsive to the contents of the vector register 60. The decoder 130 has eight output terminals which, in combination, indicate how the X and Y coordinates stored in the display register should be modified. More particularly, four terminals are associated with the X coordinate; i.e., terminals 132 and 134 are used to respectively indicate whether the X coordinate should be modified by one or two counts and terminals 136 and 138 are used to respectively indicate whether the X coordinate should be incremented or decremented. Four terminals are similarly associated with the Y coordinate. Terminals 140 and 142 are used to respectively indicate whether the Y coordinate should be modified by one or two counts and terminals 144 and 146 are used to respectively indicate whether the Y coordinate should be incremented or decremented.

A binary number can be incremented by one by adding "1" to the least significant digit thereof and propagating carries to the more significant digits where necessary. In order to increment a binary number by two, a binary "1" can be added to the second least significant digit thereof, with carries being propagated to the more significant digits where necessary. A binary number can be decremented in a similar manner by utilizing different rules with respect to the propagation of carries. Thus, a binary number can be decremented by one by subtracting "1" from the least significant digit of the number. The sum of and difference between two binary digits can be formed in a half adder circuit. When adding, a carry is developed when both digits being added are "1" and, when subtracting, a carry (preferably called a "borrow") is developed when the subtrahend digit is a "1" and the numerand digit is a "0." A binary number can be decremented by two by subtracting a binary "1" from the second least significant digit of the number.

The contents of the display register are modified by shifting the bits thereof in sequence through a half adder circuit 150. The contents of the display register are shifted in response to pulses provided by an AND gate 151 whose inputs are connected to the state $S_{10}$ output terminal of counter 54 and to the output of clock source 76. The output of AND gate 151 is in addition connected to the input of a scale of twenty counter 152 which is incremented by one count each time the display register is shifted. The contents of the display register are modified by applying appropriate carry or borrow digits to the half adder circuit 150 simultaneously with the application of the bits from the display register.

Initially consider the situation when the code in the vector register develops a true output signal on decoder output terminals 132 and 138, meaning that the X coordinate is to be incremented by one. The output terminal 132 of the decoder circuit 130 is connected to the input of an AND gate 154 whose output is connected to the input of an OR gate 156. A second input to the AND gate 154 is derived from the state $S_{10}$ output terminal of counter 54. Gate 154 is enabled when counter 152 defines a count of one. Output terminal 138 of decoder circuit 130 will provide a true signal to the input of AND gate 160 which is enabled during counts one through 10 as defined by counter 152. The output of gate 160 is connected to the input of OR gate 162. The output of OR gate 162 is connected to the input of AND gate 164 which, in addition, receives inputs from the output of the display register 58 and the OR gate 156. The output of gate 164 is connected to the input of OR gate 166, which is connected to the set input terminal of a carry/borrow flip-flop 168. When count one is defined by the counter 152, the least significant bit of the X coordinate will be applied to the half adder 150 along with a "1" bit from the OR gate 156. Similarly, OR gate 162 will provide a "1" output signal. If the least significant bit of the X coordinate is a "0," the half adder 150 will provide a "1" output and AND gate 164 will not be enabled. On the other hand, if the least significant bit of the X coordinate is a "1," the half adder circuit 150 will provide a "0" sum output but, however, the AND gate 164 will be anabled to set the flip-flop 168. The true output of flip-flop 168 is connected to the input of OR gate 156 so that, when the next bit is shifted out of the register 58, a carry or "1" bit will again be applied to the half adder circuit 150. Thus, the carry will be propagated so far as necessary to increment the X coordinate by one. The flip-flop 168 will be reset by the output of AND gate 170 in response to the first clock pulse when the OR gate 166 does not simultaneously provide a signal setting the flip-flop.

When the X coordinate is to be decremented by one, the output terminal 132 is still made true but, in lieu of the output terminal 138 being true, output terminal 136 is true to thus cause OR gate 163, rather than OR gate 162, to provide a true output signal. The output of OR gate 156 is connected to the input of AND gate 165 along with the complementary output of the display register 58. The output of the display register 58 is complemented by inverter 172. The output of AND gate 165 is connected to the input of OR gate 166. Thus, when the X coordinate is being decremented, the flip-flop 168 will be set to introduce a borrow when the output of the display register 58 is a "0" and the output of the OR gate 156 is a "1."

Incrementing or decrementing by two is accomplished in the same manner as incrementing or decrementing by one except, however, that, instead of AND gate 154 introducing a carry during count one as defined by the counter 152, AND gate 174 introduces the carry when count two is defined. Carries and borrows are then propagated through the more significant digits in the same manner as when incrementing or decrementing by one.

The Y coordinate is similarly incremented or decremented except, however, that the AND gates 176 and 178 to which the Y coordinate control terminals 144 and 146 are connected are enabled during counts 11 through 20 which define the periods during which the bits of the Y coordinate are being applied to the half adder circuit 150 by the display register. Similarly, in order to increment or decrement the Y coordinate by one, a carry or borrow is introduced to the half adder during count 11 by AND gate 180 and during count 12 by AND gate 182 in order to increment or decrement the Y coordinate by two.

An AND gate 184 is provided which is responsive to the counter 152 defining a count of 20 and to state $S_{10}$ being defined by the counter 54. When AND gate 184 is enabled, the counter 54 is driven to state $S_5$, and in addition a display point counter 186 is incremented. The display point counter 186 is a scale of four counter which is used to cause the display register to be cycled four times for each vector code of four bits stored in the vector register 60. A vector counter 188 is provided which is incremented in response to each cycle of the point counter 186, meaning that all four points of a given vector have been drawn. This vector counter 188 determines when all six vectors of a given vector word have been completed.

As previously noted, during state $S_5$ the contents of the display register are applied to the digital-to-analog converters 100 and 102 and thence to the cathode ray tube devices to deflect the beam to the defined display coordinate. Subsequently, state $S_6$ is defined to unblank the beam of the selected cathode ray tube device. After state $S_6$, if the display point counter 186 defines any count other than four, meaning, of course, that the four points of a vector have not yet been completely drawn, the state counter 54 will be driven back to state $S_{10}$ via gate 189 to increment the X and Y coordinates in the display register again by the same information in the vector register. Thus, by cycling the contents of the display register four times for each vector, four display points will be made to appear on the face of the selected cathode ray tube device. As previously noted, these display points are caused to overlap to thus create a continuous line.

If, at the end of state $S_6$, the point counter 186 defines a count of four, but the vector counter 188 defines a count less than six, it means that a further vector from the same vector word being processed must be entered into the vector register. Thus, under these conditions, AND gate 190 is enabled to drive the state counter 54 to state $S_{12}$ to thus load the vector register 60. Accordingly, it should now be apparent how the apparatus of FIG. 5 is utilized to display four points for each of six unit length vectors defined by a vector word whose bits appear serially on the data line 50. It should be realized that all four points of each of the vectors are drawn between the time the fourth bit of one vector is received and the first bit of a subsequent vector. Inasmuch as data bits are provided by the telephone line at a rate of only about one every 400 microseconds, it is relatively easy to cycle the contents of the display register four times between the reception of adjacent bits of the vector word.

As previously indicated, the foregoing description directed to FIGS. 1 through 5(*d*) is substantially the same as is contained in the aforecited patent application Ser. No. 432,585. It should be appreciated that the apparatus illustrated and described thus far includes means responsive to vector codes provided by a digital source over a limited bandwidth communication line to cause unit length vectors to be displayed by a cathode ray tube at a user station; that is, the system as thus far described contemplates the digital source providing vector direction information only. The actual length of a unit length vector is, of course, arbitrary and, as pointed out in the aforecited patent application, can be of any predetermined length. In accordance with the present invention, an improved system is contemplated in which the information provided by the digital source to the communication line defines not only vector direction, but also vector length. In the preferred embodiment of the present invention, vector length is actually defined in terms of multiples of a unit vector length, which again will be assumed to be comprised of four contiguous display points. It will again be assumed that any one of sixteen vector directions can be selected.

It will also again be assumed that a 28 bit data word is employed. FIG. 6 illustrates the respective formats of an exemplary vector word which is substantially identical to the vector word format illustrated in FIG. 4 and an alphanumeric vector word which contains both direction and length information in each of the vector codes. The alphanumeric (*A/N*) vector word is so called because it is particularly useful for defining selected vector lengths in the creation of alphanumeric characters. Of course, however, the alphanumeric vector word is also useful wherever long straight portions of curves are to be described.

As shown in FIG. 6, the vector word format is identical to that shown in FIG. 4 except, however, that the second bit of the vector word is defined as a "1" to distinguish it from the *A/N* vector word format; that is, the initial two bits of the *A/N* vector word format both comprise "0's." Whereas the vector word is comprised of six vector codes each including four bits, the *A/N* vector word format is comprised of four *A/N* vector codes each comprised of six bits. The initial four of these six bits define any one of sixteen vector directions in the same manner as the previously described vector codes. The last two bits in each *A/N* vector code define the number of times that the unit length vector should be repeated. Thus, successive "0's" indicate that the unit length vector should not be repeated, a "1" followed by a "0" indicates that the unit length vector should be repeated two more times, successive "1's" indicate that the unit length vector should be repeated three more times, and a "0" followed by a "1" indicates that the unit length vector should be repeated one more time.

Prior to considering the apparatus of FIGS. 7(*a*) and 7(*b*), which apparatus is capable of responding to the origin and erase word formats of FIG. 4 in addition to the vector and *A/N* vector word formats of FIG. 6, brief mention will be made of the state flow chart of FIG. 8. It will be recalled from the flow chart of FIG. 5(*d*) that, in response to an origin or an erase word, state $S_3$ is defined following state $S_1$. This operation is identical in the flow chart of FIG. 8, which describes the operation of the apparatus of FIGS. 7(*a*) and 7(*b*). In response to either the vector or *A/N* vector word, state $S_{13}$ is defined following state $S_1$. During state $S_{13}$ of the flow chart of FIG. 8, an *A/N* flip-flop will be set if the next bit, i.e., the second bit in the word received on the data line, is a "0." In state $S_{12}$, as previously, the initial four bits of the first vector code are entered into a vector register. During state $S_{10}$ the contents of the vector register are used to modify, either increment or decrement, the X and Y position information in the display register. After state $S_{10}$, state $S_5$ is defined, during which the beam is unblanked at its newly defined position. After state $S_5$, state $S_6$ is defined. Unless the four points of the unit length vector defined by the information in the vector register have already been drawn, the state counter will return to state $S_{10}$ after state $S_6$. After a unit length vector, i.e., four contiguous points, has been drawn, if the system is functioning in the *A/N* mode, as would be indicated by a set *A/N* flip-flop, then the next bit arriving on the data line is looked at. If it is a "0," then state $S_{11}$ is defined after state $S_6$, and the system waits for the second bit of the length information to arrive on the data line.

If, on the other hand, after the initial unit length vector has been displayed, a "1" bit appears next on the data line, then, rather than going into state $S_{11}$, the system will cycle from state $S_6$ through states $S_{10}$ and $S_5$ through eight iterations. More particularly, to describe each unit length vector in accordance with the previously made assumptions, it is necessary that the system cycle through states $S_{10}$, $S_5$, and $S_6$ P times to define the P display points. It has been assumed that P is equal to four. If the first bit of the length information in any vector code is a "1," then the system will cycle through states $S_{10}$, $S_5$, and $S_6$ eight more times to describe two additional unit length vectors or eight more display points.

If the next arriving data bit, i.e., the second bit of the length information, is a "1," the system will proceed from either state $S_6$ or state $S_{11}$ previously mentioned through states $S_{10}$, $S_5$, and $S_6$ through four more iterations to define an additional unit length vector. If the second bit of the length information is a "0," then the system will switch from either state $S_6$ or State $S_{11}$ to state $S_{12}$ to receive the next *A/N* vector code. If, however, the four *A/N* vector codes have already been operated upon, then state $S_0$ will next be defined to await a new word. Thus, in response to each *A/N* vector code, a vector will be displayed comprised of PQ display points where P has been assumed to be four and Q can comprise any number from 1 to 4.

Attention is now called to FIG. 7(*a*), which it will be noted is very similar to previously described FIG. 5(*a*). Accordingly, corresponding parts in FIGS. 5(*a*) and 7(*a*) are identified by the same designating numerals. Rather than repeat the complete description of the portions of FIG. 7(*a*), only the portions thereof which distinguish it from the previously described FIG. 5(*a*) will be discussed. More particularly, a alphanumeric flip-flop 200 is provided. The set input terminal of flip-flop 200 is connected to the output of AND gate 202. The sync line 52 is connected to the input of AND gate 202 along with the data line 50 through an inverter 204. In addition, the state $S_{12}$ output terminal of counter 54 is connected to the input of gate 202. Thus, during state $S_{13}$ the *A/N* flip-flop 200 is set when a "0" bit (i.e., bit two of a word) appears on the data line. The flip-flop 200 is reset when state $S_0$ is next defined by the sounter 54.

An additional gate 206 is provided whose inputs are connected to the sync line 52 and to the state $S_{13}$ output terminal of the counter 54. The output of gate 206 forces the counter 54 to state $S_{12}$.

An AND gate 208 is provided connected to the set input terminal of previously referred to flip-flop 122. The state $S_{12}$ output terminal of counter 54 is connected to the input of AND gate 208 along with the output of the clock pulse source 76. In addition, the false output terminal of flip-flop 122 is connected to the input of AND gate 208. The flip-flop 122 is reset by the output of AND gate 210. The output clock pulse source 76 is connected to the input of gate 210 along with the state $S_{10}$ output terminal of counter 54.

Gate 206 assures that state $S_{12}$ will be defined after state $S_{13}$. In response to the initial clock pulse during state $S_{12}$, a pulse will be provided through OR gate 124 to load a "1" into the vector register 60 prior to the arrival of the initial bit of the vector code. The output of gate 208 will also set flip-flop 122 so that a "1" will be inserted into the vector register only in response to the initial clock pulse during state $S_{12}$. Inasmuch as gate 208 will provide an output pulse each time a new vector code is loaded into the vector register 60, the output of gate 208 can be connected to the input of vector counter 212 in order to at all times indicate the position of the vector code being operated upon in the vector word being sent over the data line 50. The vector counter 212 can be used instead of the vector counter 188 of FIG. 5(*d*).

When the initial four bits of a vector code describing the vector direction are shifted into the proper position in the vector register 60, the initially inserted "1" bit will cause gate 128 to switch counter 54 to state $S_{10}$. This will reset flip-flop 122. In state $S_{10}$, the position information in the display register 58 will be iteratively modified through four cycles in accordance with the contents of the vector register 60 to thus define a unit length vector comprised of four display bits.

Attention is now called to FIG. 7(*b*), which illustrates the gates responsive to various conditions for controlling the sequencing of the apparatus between the states $S_6$, $S_{11}$, $S_{12}$, and $S_{10}$. Consider initially that a vector word is being received and that the system is functioning in a non-*A/N* mode as indicated by a false state of flip-flop 200. When the point counter 186 indicates a count of four and the vector counter 212 indicates a count of six, AND gate 300 will provide a signal to switch the state counter 54 to state $S_0$ a short time after state $S_6$ is defined; that is, the output of multivibrator 108 of FIG. 5(*a*) provides a delayed output pulse ($S_6D$) a short time interval after state $S_6$ is defined.

Prior to completing the four iterations required to define a unit vector length, gate 302 will switch counter 54 to state $S_{10}$ each time after state $S_6$ is defined. After the four points of a unit length vector have been defined, as indicated by point counter 186 defining a count of four, then AND gate 304 will switch counter 54 to state $S_{12}$ in the event the vector counter 212 does not define a count of six. In state $S_{12}$ the next vector code will be loaded into the vector register 60.

Thus far, the comments with respect to FIG. 7(*b*) have assumed operation in a non-*A/N* mode. Assume now that the *A/N* mode is defined. After an initial unit length vector is defined by the counter 186 indicating a count of four, the system will wait in state $S_6$ until the next pulses arrive on the data and sync lines 50 and 52, respectively. If the data pulse is a "0," then the counter 54 is switched to state $S_{11}$ by gate 306. If, on the other hand, the data bit comprises a "1," then AND gate 308 returns the counter 54 to state $S_{10}$ to thereby sequence the counter through another four iterations to define a second unit length vector. The output of gate 308 in addition sets flip-flop FFA. When the second unit length vector is completed as indicated by the point counter 186 next defining a count of four, gate 310 will again switch the state counter 54 to state $S_{10}$ if flip-flop FFA is set. Accordingly, the output of gate 310 will cause the third unit length vector to be defined. In addition, the output of gate 310 will reset flip-flop FFA through AND gate 311 and will set flip-flop FFB.

With either flip-flop FFB set or state $S_{11}$ defined, AND gate 312 will force state counter 54 to state $S_{10}$ if the next bit on the data line is a "1"; that is, if the second of the two bits of the length information in each *A/N* vector code is a "1," then state $S_{10}$ is again defined to sequence the counter 54 through another four iterations comprised of states $S_{10}$, $S_5$, and $S_6$ to thereby draw an additional unit length vector. If, on the other hand, the second bit in the length information is an "0," then either gate gate 314 or gate 318 will provide an output pulse depending upon whether or not the vector counter 212 defines a count of four indicating that the four vectors in an *A/N* vector word have been displayed. If the vector counter 212 does define a count of four, then gate 318 will switch the counter 54 back to state $S_0$ and await a new word on the data line 52. On the other hand, if the vector counter 212 does not define a count of four, then gate 314 switches counter 54 to state $S_{12}$ to input the next vector code into the vector register 60.

It has previously been pointed out that AND gate 312 will provide an output pulse in the event the second bit of the length information is a "1". The output of gate 312, in addition to forcing the state counter 54 to state $S_{10}$, sets the flip-flop FFC. The sync pulse in synchronism with the second bit of the length information is used to reset flip-flop FFB through gate 319.

After the state counter 54 has cycled through the four iterations required to define the last unit length vector in response to a "1" bit in the second bit position of the length information, then either gate 316 or gate 320 will provide an output pulse in response to the point counter 186 next defining a count of four; that is, with flip-flop FFC set and point counter 186 defining a count of four, AND gate 316 will force state counter 54 to state $S_{12}$ if the vector counter 212 does not define a count of four. In state 212, of course, a subsequent vector code will be entered into the vector register 60. On the other hand, with flip-flop FFC set and the point counter 186 defining a count of four, AND gate 320 will force counter 54 to state $S_0$ if the vector counter 212 defines a count of four. In state $S_0$, of course, a new word is awaited. Flip-flop FFC is reset by the output of OR gate 321, which is enabled in response to outputs provided by either AND gate 316 or 320.

From the foregoing, it should be appreciated that an improved data compression and display system has been provided herein in which information to be displayed can be provided to a user station by a computer over a limited bandwidth channel in the form of vectors whose length and direction can both be defined by data provided by the computer. Although a preferred embodiment of the invention has been disclosed herein in which sixteen different vector directions and four different vector lengths can be defined, it should be appreciated that a greater or lesser range of directions and lengths can be provided if warranted. Moreover, as previously pointed out, although a unit length vector has been assumed herein as being comprised of four contiguous display points, a longer or shorter unit length vector can be employed. Still further, although a preferred apparatus and word format have been disclosed in detail herein, it is recognized that many variations will occur to those skilled in the art which fall within the spirit of the invention and which are encompassed by the scope of the appended claims.

The embodiments of the invention in which an exclusive property or privilege is claimed are defined as follow:

1. In combination with a matrix including MN points and a positionable means adapted to be positioned at any one of said points:
- a register for storing digital position information identifying a first of said MN points;
- means responsive to said digital position information stored in said register for positioning said positionable means at the matrix point identified thereby;
- source means providing digital information defining a selected vector direction and length;
- first means responsive to said information defining said vector direction for modifying said position information stored in said register;
- second means for repeating said modifying of said position information a finite number of times dependent upon said information defining said vector length.

2. The combination of claim 1 wherein said first means includes cyclic means operable to identically modify said position information a fixed number of times to thus define a corresponding number of points comprising a unit vector length.

3. The combination of claim 2 wherein said second means includes means for operating said cyclic means through a number of iterations dependent upon said information defining said vector length.

4. A display system comprising:
- a cathode ray tube having a target thereon comprised of a matrix of M columns and N rows:
- means in said cathode ray tube for generating an electron beam;
- a storage register including vertical and horizontal deflection information portions;
- means responsive to information stored in said vertical and horizontal deflection information portions for respectively deflecting said beam to one of said M columns and one of said N rows;
- a source means providing first and second words;
- said first words including information identifying one of said M columns and one of said N rows, said second words including information defining a selected vector direction and length;
- means responsive to the provision of said first words for storing the information therein in said storage register; and
- modifying means responsive to the provision of said second words for modifying the information in said storage register in accordance with said information defining said vector direction and length.

5. The system of claim 4 wherein said modifying means includes cyclic means operable to identically modify said information in said storage register a fixed number of times to thus define a corresponding number of matrix positions comprising a unit vector length.

6. The system of claim 5 wherein said modifying means further includes means for operating said cyclic means through a number of iterations dependent upon said information defining said vector length.

7. A computing and display system comprising:
- a computer;
- a display device;
- a communication channel coupling said computer to said display device;
- said display device comprising a cathode ray tube including a target comprised of a matrix of MN display points, a positionable display means, means for generating an electron beam, and deflection means for deflecting said electron beam to selected points in said matrix;
- said computer including means for applying origin point information to said communication channel identifying a first point in said matrix;
- a display storage register connected to said communication channel for storing said origin point information;
- said deflection means responsive to said information stored in said display storage register for deflecting said electron beam to the matrix point identified thereby;
- said computer including means for applying vector information to said communication channel identifying a vector direction and length;
- means for unblanking said beam at each matrix point identifed by information stored in said display storage register; and
- means responsive to said vector direction information for incrementing said information in said storage register through P identical steps to define P contiguous matrix points comprising a unit vector length.

8. The system of claim 7 including means responsive to said vector length information for incrementing said information in said storage register through Q cycles each comprised of said P identical steps.

9. A computing and display system comprising:
- a computing station;
- an operator station;
- a communication channel coupling said computing station to said operator station;
- said operator station including a display device comprising a matrix of MN display points, a positionable display means, and deflection means for deflecting said display means to selected points in said matrix;
- said computing station including means for applying to said communication channel an origin word comprised of a plurality of digits and including a position portion identifying a first matrix point in terms of its abscissa and ordinate values in said matrix;
- a shift register having an output terminal and an input terminal connected to said communication channel for storing said position portion of said origin word;
- said deflection means being selectively actuatable to respond to said information stored in said shift register for deflecting said display means to the matrix point identified thereby;
- said computer station including means for successively applying vector codes to said communication channel, each vector code including information defining a vector direction in terms of its abscissa and ordinate distances from a previously identified matrix point and a vector length;
- a vector register connected to said communication channel for receiving and storing said information defining said vector direction;

an arithmetic means having first and second input terminals and an output terminal;

means for shifting the information stored in said shift register and for serially applying the digits appearing at the output terminal thereof to said first arithmetic means input terminal;

logic circuit means responsive to said information stored in said vector register for applying digits to said second arithmetic means input terminal in synchronism with said digits supplied by said shift register;

means for coupling said arithmetic means output terminal to said shift register input terminal;

means for iteratively shifting said information stored in said shift register through said arithmetic means to define a first unit length cycle comprised of P iterations defining P matrix points;

means responsive to said information defining said vector length for repeating said unit length cycle Q times to define QP matrix points; and means for actuating said deflection means once for each cycle of said shift register.

10. The system of claim 9 wherein said vector direction information portions of said vector codes successively applied to said communication channel are successively stored in said vector register; and wherein said information stored in said shift register is cyclically shifted through said arithmetic means while the direction information portion of one of said vector codes is stored in said vector register and prior to subsequent information being entered therein.

11. The system of claim 9 wherein said vector codes are comprised of a plurality of digits applied in sequence to said communication channel and including a first set of digits defining said vector direction information and a second set of digits defining said vector length information; and wherein said first unit length cycle is defined in response to said first set of digits and subsequent unit length cycles are defined in response to said second of digits.

References Cited

UNITED STATES PATENTS

| | | | |
|---|---|---|---|
| 3,037,192 | 5/1962 | Everett | 340—172.5 |
| 3,242,470 | 8/1962 | Hagelbarger et al. | 340—172.5 |
| 3,256,516 | 6/1962 | Melia et al. | 340—172.5 |
| 3,307,156 | 10/1962 | Durr | 340—172.5 |

PAUL J. HENON, *Primary Examiner.*

PAUL R. WOODS, *Assistant Examiner.*

U.S. Cl. X.R.

340—324